United States Patent [19]

Watanabe

[11] Patent Number: 5,031,154
[45] Date of Patent: Jul. 9, 1991

[54] THREE-DIMENSIONAL OBJECT IMAGING METHOD AND SYSTEM

[75] Inventor: Sumio Watanabe, Yokohama, Japan

[73] Assignee: Ricoh Company, Ltd., Japan

[21] Appl. No.: 574,764

[22] Filed: Aug. 30, 1990

[30] Foreign Application Priority Data

| Sep. 4, 1989 | [JP] | Japan | 1-229025 |
| Sep. 7, 1989 | [JP] | Japan | 1-232320 |
| Mar. 13, 1990 | [JP] | Japan | 2-62280 |
| Jul. 2, 1990 | [JP] | Japan | 2-174862 |

[51] Int. Cl.$^5$ .............................................. G03H 3/00
[52] U.S. Cl. ................................................. 367/8; 73/603
[58] Field of Search ................. 367/8, 7, 11, 135; 73/603, 602; 209/590

[56] References Cited

U.S. PATENT DOCUMENTS 4,209,835 6/1980 Hyatt ................................ 367/8

Primary Examiner—Daniel T. Pihulic
Attorney, Agent, or Firm—Mason, Fenwick & Lawrence

[57] ABSTRACT

A three-dimensional object imaging method is implemented on a computer for imaging an object. The three-dimensional object imaging method includes the steps of irradiating ultrasonic waves having two mutually different frequencies on the object which is to be imaged, measuring sound pressures of scattering waves from the object so as to obtain two acoustical holography images thereof, and obtaining a three-dimensional shape of the object based on a phase error between the two acoustical holography images.

16 Claims, 9 Drawing Sheets

```
o o o o o o o o o o o o o o o o
o o o o o o o o o o o o o o o o
o o o o o o o o o o o o o o o o
o o o o o o o o o o o o o o o o
o o o o P P P P P P P P o o o o
o o o o P P P P P P P P o o o o
o o o o P P P P P P P P o o o o
o o o o P P P P P P P P o o o o
o o o o P P P P P P P P o o o o
o o o o P P P P P P P P o o o o
o o o o P P P P P P P P o o o o
o o o o P P P P P P P P o o o o
o o o o o o o o o o o o o o o o
o o o o o o o o o o o o o o o o
o o o o o o o o o o o o o o o o
o o o o o o o o o o o o o o o o
```

THREE-DIMENSIONAL OBJECT IMAGING METHOD AND SYSTEM

BACKGROUND OF THE INVENTION

The present invention generally relates to three-dimensional object imaging methods and systems, and more particularly to a three-dimensional object imaging method and a three-dimensional object imaging system which are applicable to automatic recognition systems for recognizing three dimensional objects, ultrasonic robot eye and the like.

There is active research in automatic recognition techniques for recognizing a three-dimensional shape using mainly a television camera for the purpose of improving factory automation. However, an automatic recognition system which satisfactorily processes three-dimensional information of an object has not yet been reduced to practice. The automatic recognition system which uses the television camera suffers from problems in that the quantity of input data is extremely large and it is impossible to process the three-dimensional information of objects such as a metal object having a mirror surface which reflects light and a transparent object through which light can transmit.

On the other hand, in order to realize an intelligent robot, it is desirable to develop a robot eye which can identify and measure objects and also recognize the outside. As conventional methods of recognizing the outside, various methods using light wave, X-ray, electromagnetic wave, sound wave and the like as the wave medium have been proposed, but no decisive method has emerged.

According to the method using the ultrasonic wave, it is possible to measure the general shape of the object. However, it is impossible to identify the object from the information obtained by the measurement or estimate the position and rotary angle of the object. For example, Watanabe et al., "The Ultrasonic Robot Eye System Using Neural Network", Electronic Information Communication Society, 2.22, 1989 proposes identification of a plannar object. However, when the object has a three-dimensional shape, the conventional method cannot identify the object, estimate the position and rotary angle of the object, or form an image of the object with a high definition.

The use of ultrasonic wave for recognition of the three-dimensional object has the following advantages.

First, it is possible to measure the phase of the scattering waves from the object and the change of the sound pressure with time because the propagation velocity of the sound wave is relatively slow, and as a result, it is possible to directly obtain three-dimensional information of the object. In the system which uses the light wave as the wave medium such as the system which uses the television camera, it is possible to obtain a two-dimensional image of the object relatively easily, however, it is difficult to accurately estimate information along the depth of the object since this requires a technique of analyzing the image. For this reason, even in the robot which uses the television camera as the main sensor, an ultrasonic sensor is provided in most cases for the purpose of detecting the existence of the object and measuring a distance between the robot and the object. As one application which utilizes the advantage of using the ultrasonic wave, there is a guidance system for the blind which is being developed.

Second, it becomes possible to recognize metal, transparent and black objects, fluids and the like by use of the ultrasonic wave. It is virtually impossible to recognize such objects by use of the television camera because of the large or small reflection, transparency and the like of these objects with respect to light. When the recognition system is applied to the factory automation, parts of the product may be made of a metal, and the method which uses the ultrasonic wave is thus better suited for recognizing such metal parts. Various systems which use the ultrasonic wave image for checking, recognition and the like have been reduced to practice. Examples of such systems are a system for automatically distinguishing 150 kinds of empty bottles in a supermarket, a system for automatically detecting a content level of a softdrink bottle, a system for automatically checking whether or not a straw is attached to the side of a paper container containing a softdrink and the like.

Third, by use of the ultrasonic wave, it becomes possible to make an object recognition even under difficult circumstances such as inside a turbid fluid, a dark room, a room filled with smoke and the like. To take advantages of this feature, there is research to use the ultrasonic robot eye for carrying out various tasks in deep water, for making rescue operations in fire and the like.

On the other hand, the object recognition method which uses the ultrasonic wave cannot match the high resolution obtainable on the television camera because the wavelength of the ultrasonic wave is long and there are limits to the size of the wave receiver array and the number of wave receivers. For this reason, the object recognition method which uses the ultrasonic wave is at the present confined to the use in making measurements on a living body and to the use underwater.

The so-called ultrasonic wave holography technique irradiates the ultrasonic wave on the object, measures space information of the reciprocal scattering wave from the object on a receiver transducer array, and calculates a reconstructed image of the object. However, this known technique generally introduces a large distortion in the reconstructed image and the resolution is too poor for practical use. These problems are caused mainly by the long wavelength of the ultrasonic wave, the limited size of the wave receiver array and the limited number of wave receivers in the wave receiver array.

SUMMARY OF THE INVENTION

Accordingly, it is a general object of the present invention to provide a novel and useful three-dimensional object imaging method and system in which the problems described above are eliminated.

Another and more specific object of the present invention is to provide a three-dimensional object imaging method implemented on a computer for imaging an object, comprising the steps of irradiating ultrasonic waves having two mutually different frequencies on the object which is to be imaged, measuring sound pressures of scattering waves from the object so as to obtain two acoustical holography images thereof, and obtaining a three-dimensional shape of the object based on a phase error between the two acoustical holography images. According to the method of the present invention, it is possible to identify the object which has the three-dimensional shape, estimate the position and rotary angle of the object and reconstruct the image of the object, regardless of whether the object is made of a metal or is transparent. In addition, it is possible to obtain an acoustical image having a high resolution at a high speed by use of a relatively small number of wave receivers.

Still another object of the present invention is to provide a three-dimensional object imaging method implemented on a computer for imaging an object, comprising the steps of irradiating electromagnetic waves having two mutually different frequencies on the object which is to be imaged, measuring scattering waves from the object so as to obtain two acoustical holography images thereof, and obtaining a three-dimensional shape of the object based on a phase error between the two acoustical holography images.

A further object of the present invention is to provide a three-dimensional object imaging system for imaging an object, comprising irradiating means for irradiating ultrasonic waves having two mutually different frequencies on the object which is to be imaged, detecting means for detecting sound pressures of scattering waves from the object, and processing means coupled to the detecting means and including first means for obtaining two acoustical holography images thereof, and second means for obtaining a three-dimensional shape of the object based on a phase error between the two acoustical holography images. According to the system of the present invention, it is possible to identify the object which has the three-dimensional shape, estimate the position and rotary angle of the object and reconstruct the image of the object, regardless of whether the object is made of a metal or is transparent. In addition, it is possible to obtain an acoustical image having a high resolution at a high speed by use of a relatively small number of wave receivers.

Another object of the present invention is to provide a three-dimensional object imaging system for imaging an object, comprising irradiating means for irradiating electromagnetic waves having two mutually different frequencies o the object which is to be imaged, detecting means for detecting sound pressures of scattering waves from the object, and processing means coupled to the detecting means and including first means for obtaining two acoustical holography images thereof, and second means for obtaining a three-dimensional shape of the object based on a phase error between the two acoustical holography images.

Other objects and further features of the present invention will be apparent from the following detailed description when read in conjunction with the accompanying drawings.

DESCRIPTION OF THE PREFERRED EMBODIMENTS

When an ultrasonic wave (burst wave) is irradiated on an object and scattering waves from the object are measured to identify the object having the three-dimensional shape, estimate the position and rotary angle of the object or form an image of the object with a high definition, the general shape of the object is first reconstructed. Acoustical holography images of the object are reconstructed using two mutually different frequencies, and a phase error between the two acoustical holography images is obtained. In addition, an acoustical holography method which will be described later is employed with respect to the X and Y directions, and a time division method which will be described later is employed with respect to the Z direction. Next, a neural network learns the general shape of the object thus obtained, so that the identification of the object having the three-dimensional shape, the estimation of the position and rotary angle of the object, the high-definition three-dimensional image of the object and the like can be made.

Figure 1:
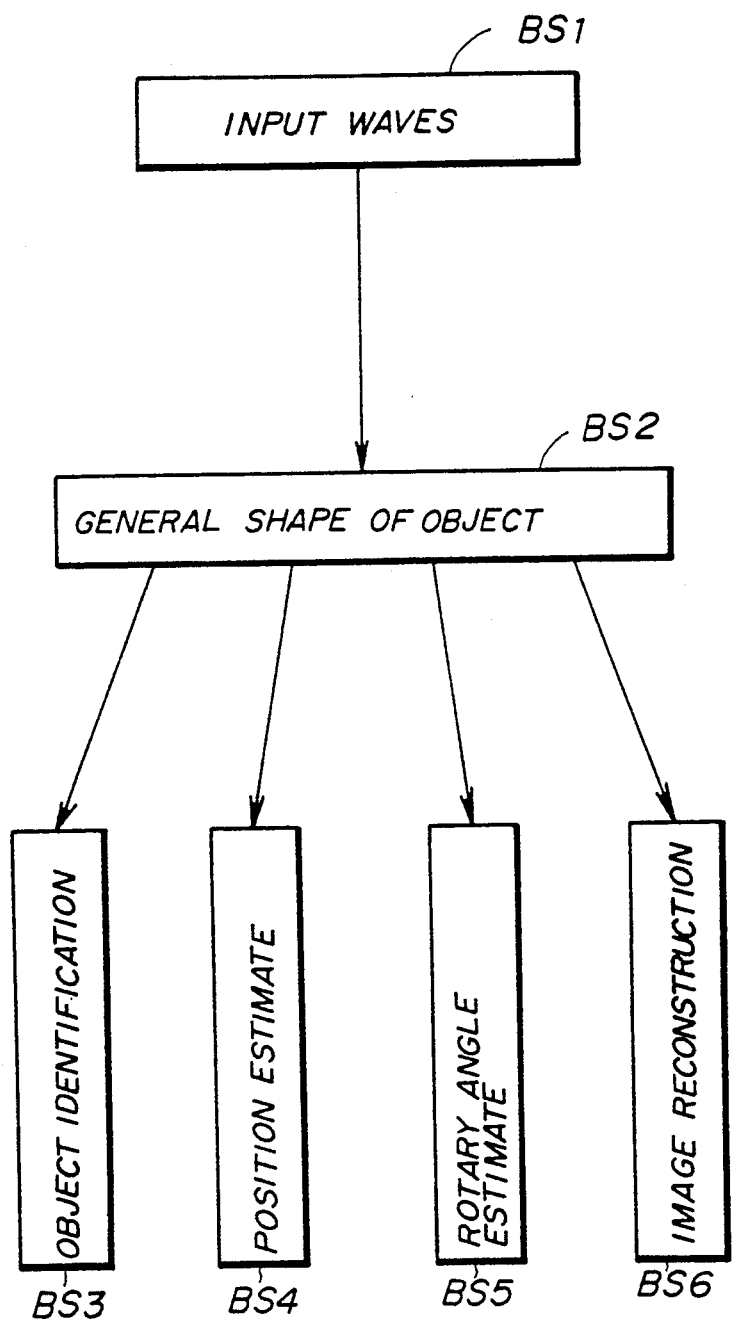
FIG. 1 is a diagram generally showing an application range of a three-dimensional object imaging system according to the present invention.

FIG. 1 generally shows the application range of the present invention described above. In FIG. 1, a step BS1 enters the scattering waves from the object, and a step BS2 obtains the general shape of the object. After the step BS2, any one of steps BS3 through BS6 is carried out. The step BS3 makes an object recognition. The step BS4 estimates the position of the object. The step BS5 estimates the rotary angle of the object. The step BS6 reconstructs the three-dimensional image of the object.

Figure 2:
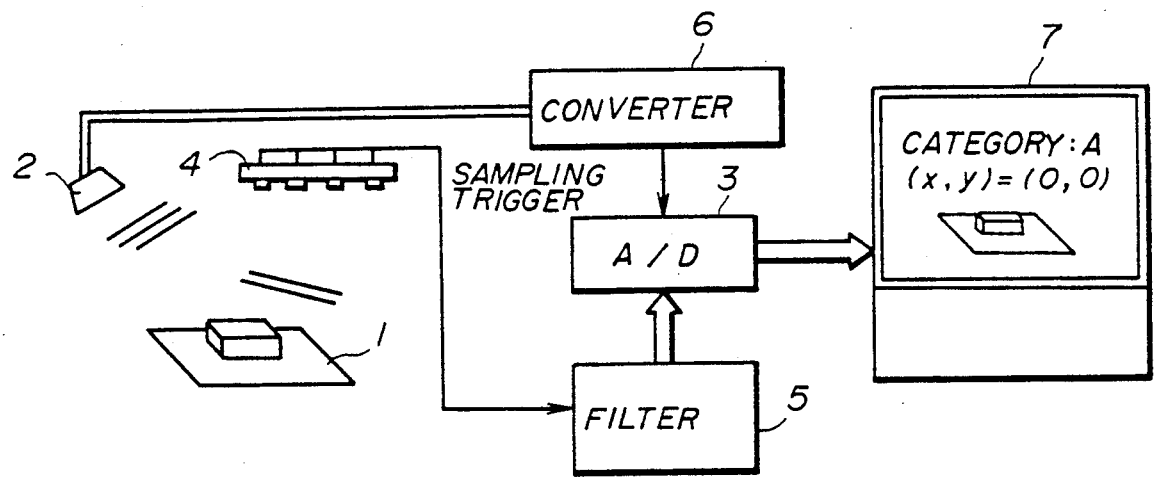
FIG. 2 is a system block diagram showing a first embodiment of the three-dimensional object imaging system according to the present invention.
Figure 3:
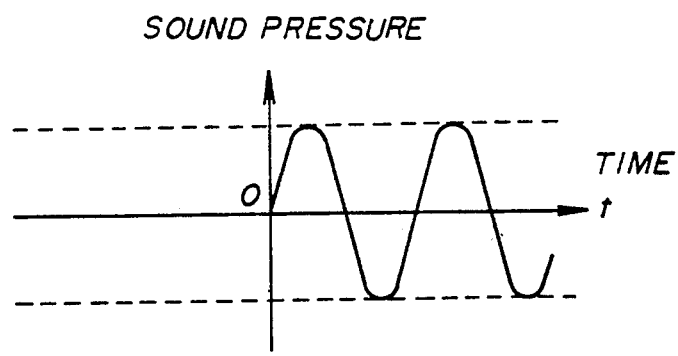
FIG. 3 shows a waveform of an ultrasonic wave.

FIG. 2 shows a first embodiment of the three-dimensional object imaging system according to the present invention which employs a first embodiment of a three-dimensional object imaging method according to the present invention. The three-dimensional object imaging system includes an ultrasonic wave transmitter 2, an analog-to-digital (A/D) converter 3, an nxn ultrasonic wave receiver array 4, an amplifier and noise elimination filter 5, a converter 6 and a computer 7 which are coupled as shown. The ultrasonic wave transmitter 2 successively irradiates two kinds of ultrasonic burst waves having mutually different frequencies on an object 1. The two kinds of ultrasonic waves transmitted from the ultrasonic wave transmitter 2 may be continuous waves. In this embodiment, it is assumed for the sake of convenience that the two kinds of ultrasonic burst waves respectively have frequencies of 40 kHz and 41 kHz. The ultrasonic burst waves respectively have a sound pressure waveform shown in FIG. 3.

Figure 4:
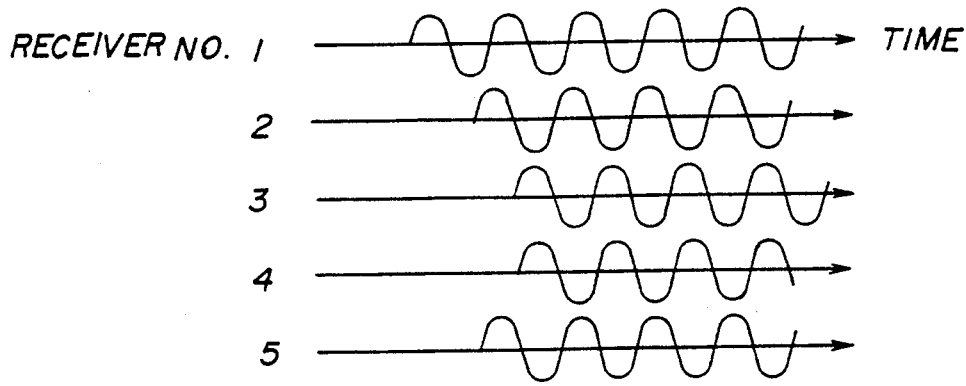
FIG. 4 shows a waveform of sound pressures of the measured ultrasonic wave.

The sound pressures measured by the receiver array 4 are passed through the amplifier and noise elimination filter 5 and the A/D converter 3 and supplied to the computer 7. FIG. 4 shows the sound pressure waveforms received by the wave receivers having receiver numbers "1" through "5".

When the irradiated ultrasonic waves are regarded as reference waves and inner products of the scattering waves and the reference waves are calculated, it is possible to obtain a cosine component and a sine component of the scattering waves. As a result, it is possible to obtain a complex sound pressure P(R) of the scattering waves.

Figure 5:
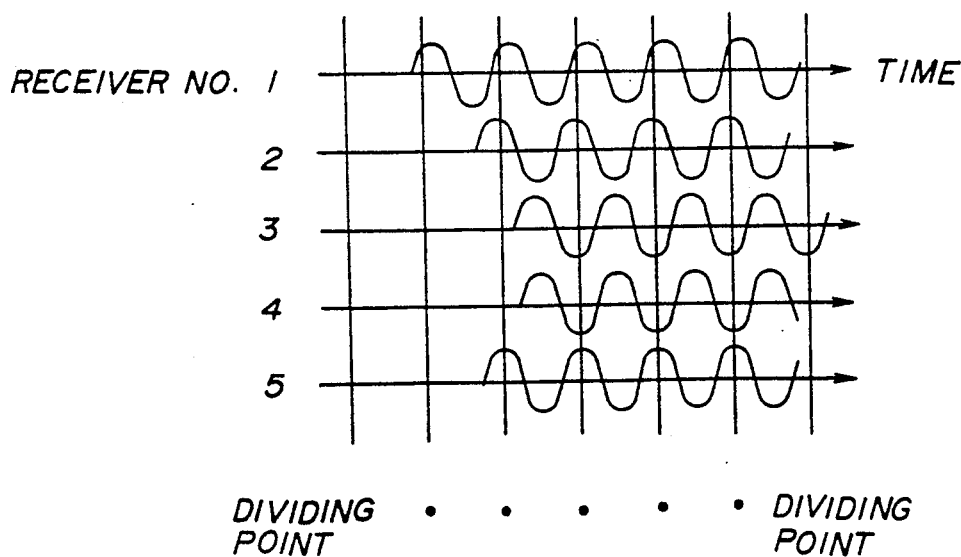
FIG. 5 shows a division of the waveform shown in FIG. 4 in time.

In addition, in the computer 7, the sound pressure waveforms received by the receiver array 4 are divided at various points in time as shown in FIG. 5. The sound pressure waveforms are divided at intervals which are integral multiples of one period of the sound pressure waveforms. The information related to the depth of the object 1 can be obtained by multiplying the propagation velocity to the time information, but of course, the distance information obtained is multiplied by ½ because the time information covers the going and returning distances.

Figure 6:
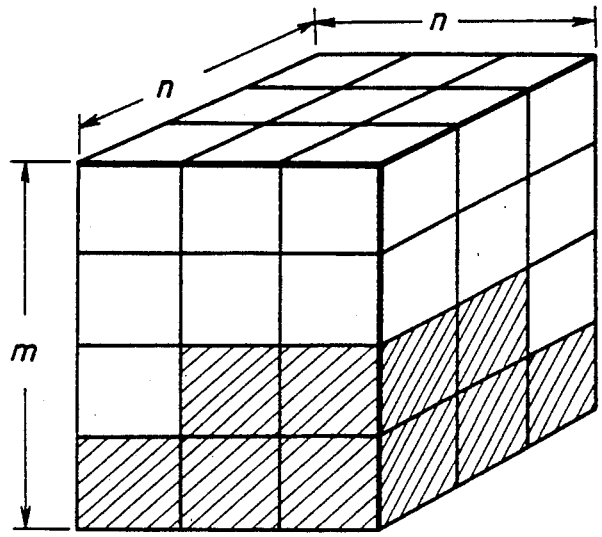
FIG. 6 is a diagram showing information which is obtained when an ultrasonic wave receiver array includes nxn wave receivers and the number of division in a direction of the depth is m.

In each section of the divided sound pressure waveforms, the measured sound pressure can be regarded as a continuous sine wave. Hence, a normal acoustical holography method can be employed for the image reconstruction method which is used for the X and Y directions. In this embodiment, the receiver array 4 is made up of n×n ultrasonic wave receivers, and the information which is obtained includes n×n×m data as shown in FIG. 6 when the number of divisions along the direction of the depth of the object 1 is m.

Figure 7:
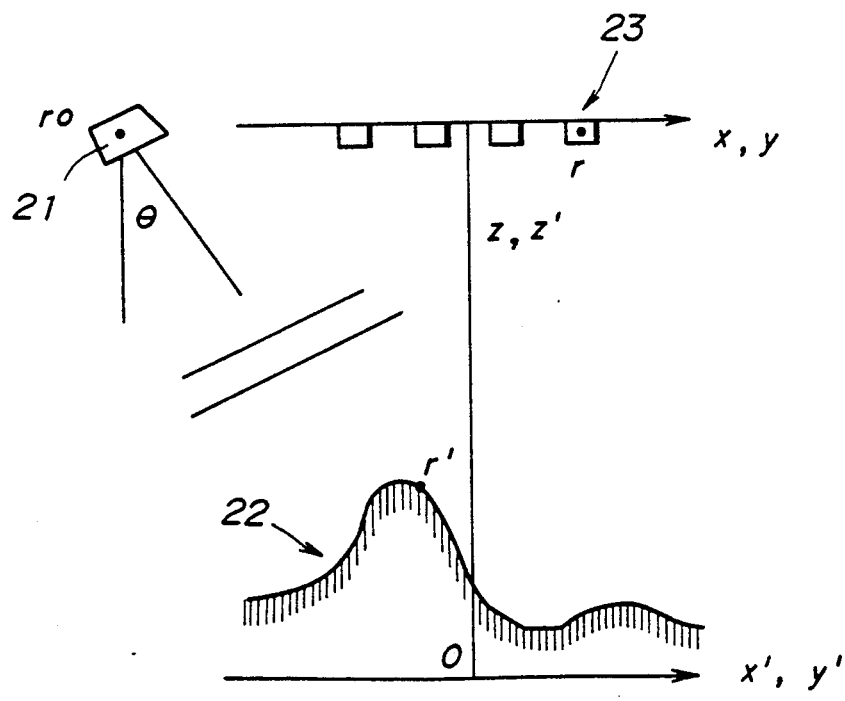
FIG. 7 is a diagram for explaining a threoretical equation of a complex sound pressure of scattering waves.

On the other hand, the complex sound pressure P(R) can theoretically be calculated as follows. FIG. 7 is a diagram for explaining the theoretical formulas In FIG. 7, there are shown an ultrasonic wave transmitter 21, an object 22 and an array type receiver 23. A surface equation of the object 22 is described by $z' = \rho(x', y')$, the reflection coefficient is denoted by $\xi(x', y')$ and the irradiation angle of the ultrasonic wave is denoted by $\theta$. In this case, a transmitted wave Pi(r) can be described by $Pi(r) = exp(iki \cdot r)$, where $ki = (k \sin\theta, 0, -k \cos\theta)$. For this reason, a complex sound pressure P(r) of the receiver 23 at a position r=(x, y, z) can be described by the following formula (1), where $$V = (-k(x/r - \sin\theta, -ky/r, -k(z/r + \cos\theta)) \quad (1)$$
$$r' = ((x', y', \rho(x', y')) \text{ and}$$
$$F(r) = |V|^2/(-k(z/r + \cos\theta)).$$
$$P(r) = i\exp(ikr)F(r)/(4\pi r)$$
$$\int dx' \int dy' \exp(iV \cdot r')\xi(x', y')$$

When the inverse Fourier transform is used, the formula (1) can be rewritten as the following formula (2).

$$\xi(x', y')\exp(-ik(1 + \cos\theta)\rho(x', y')) = [k/(2\pi z)]^2 \exp(-ikx'\sin\theta) \int dx \int dy$$

-continued
$$P(r)4\pi r \exp(ik(xx' + yy')/z - ikr)/iF(r) \quad (2)$$

Accordingly, the following formula (3) can be obtained by denoting the right hand term of the formula (2) by H(r), where arg(x) denotes an argument of a complex number x and n denotes a predetermined integer.

$$-k(1 + \cos\theta)\rho(x', y') = arg(H(k)) + 2n\pi \quad (3)$$

In order to obtain the three-dimensional shape of the object 22, a value which is obtained through experiments is substituted into P(r) of the formula (1) so as to obtain H(k), and $\rho(x', y')$ is next calculated using the formula (3). However, the formula (3) has an uncertainty of $2n\pi$, and only the principal value within the uncertainty is obtained as $\rho(x', y')$. Accordingly, the range of $\rho(x', y')$ is $0 \leq \rho(x', y') \leq 2\pi/(k(1+\cos\theta))$. When the ultrasonic wave has a practical frequency of 40 kHz, for example, the above described range becomes approximately 4 mm which is extremely narrow. Hence, in the present invention, a wave having another wave number $k + \Delta k$ is used to make similar measurements, and the following formula (4) is obtained in place of the formula (3).

$$-(k + \Delta k)(1 + \cos\theta)\rho(x', y') = arg(H(k + \Delta k)) + 2m\pi \quad (4)$$

Then, the formula (3) is subtracted from the formula (4) to obtain the following formula (5).

$$-\Delta k(1 + \cos\theta)\rho(x', y') = \quad (5)$$
$$arh(H(k + \Delta k)) - arg(H(k)) + 2(m - n)\pi$$

In the formula (5), the reconstruction range of $\rho(x', y')$ is $0 \leq \rho(x', y') \leq 2\pi/(\Delta k(1+\cos\theta))$.

Since $\Delta k$ can be made as small as desired, it is possible to obtain a general shape which has the height in the desired range.

Next, a reflection coefficient $\eta(x', y', z')$ of the three-dimensional object 22 is defined by the following formula (6), where $\delta(x)$ denotes a Dirac delta function. The formula (6) can be used to rewrite the formula (1) in the form of the following formula (7).

$$P(r) = i\exp(ikr)F(r)/(4\pi r) \quad (7)$$
$$\int dx' \int dy' \int dz' \exp(iV \cdot r')\eta(x', y')$$
$$= i\exp(ikr)F(r)/(4\pi r)$$
$$\int dx' \int dy' \int dz' \exp(ik(x'\sin\theta - z'\cos\theta))$$
$$\eta(x', y')\exp(-ik(xx' + yy' + zz')/r)$$

By using the three-dimensional Fourier inverse transform with respect to the positions x and y and the wave number k, it is possible to obtain the shape $\eta(x', y')$ of the three-dimensional object 22 from the measured sound pressure.

Figures 8, 12:
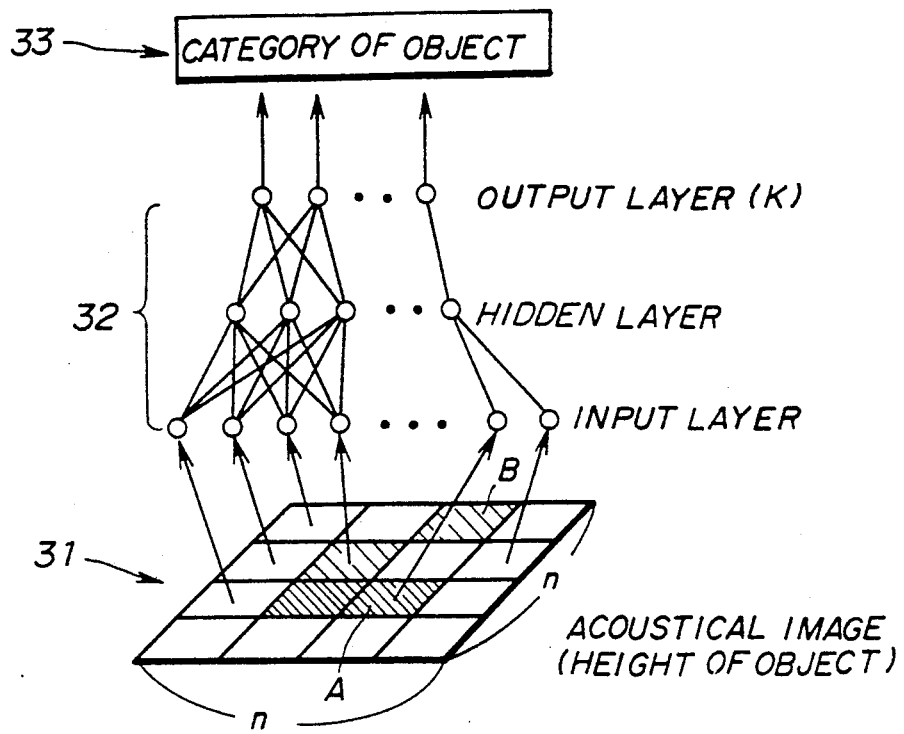
FIG. 8 is a diagram for explaining a use of a neural network in a second embodiment of the three-dimensional object imaging system according to the present invention.
FIG. 12 is a diagram for explaining an insertion of dummy sound pressures.

FIG. 8 is a diagram for explaining a second embodiment of the three-dimensional object imaging system according to the present invention which uses a neural network. FIG. 8 shows a general shape (n×n) 31 of the object which is obtained in the above described manner, a three-layer feed forward type neural network 32 and an output result 33 of the neural network 32. This neural network 32 is simulated on the computer 7 shown in FIG. 2.

The neural network 32 for identifying K kinds of objects is constructed as follows. Because the general shape 31 of the object is made up of n×n information, input units of the neural network 32 is also n×n. The acoustical image which is the general shape 31 of the object includes height information of the object. A dark hatching A indicates a low image and a light hatching B indicates a high image. The number of units in the hidden layer may be determined appropriately. The number of units in the output layer is K. The general shape 31 of the object (n×n information) is used as the input data, and the learning data is (1, 0, 0, ..., 0) when the object belongs to a first category, (0, 1, 0, 0, ..., 0) when the object belongs to a second category, and (0, 0, 0, ..., 1) when the object belongs to the last category. When the set of the input data and the corresponding output data is given, it is possible to construct the neural network 32 which obtains the desired output based on a known back propagation method.

In FIG. 8, the neural network 32 is designed to identify K kinds of objects. However, the neural network 32 may be designed to estimate the position of the object by taking the following measures. In other words, the input layer, the output layer and the hidden layer of the neural network are made the same as those shown in FIG. 8. When it is assumed that the output layer estimates in P stages for the X direction, Q stages for the Y direction and R stages for the Z direction, the number of units of the output layer is (P+Q+R). The learning data is constructed as follows. That is, when the position of the object belongs to (s, t, u) of the above described stages, only the sth, (s+t)th and (s+t+u)th units are regarded as "1" and the remaining units are regarded as "0". The learning system is the same as that shown in FIG. 8 described above.

In addition, the neural network 32 may be designed to estimate the rotary angle of the object by taking the following measures. In other words, the input layer, the output layer and the hidden layer of the neural network are made the same as those shown in FIG. 8. When it is assumed that the output layer estimates in R stages for the angular direction, the number of units of the output layer is R. The learning data is constructed as follows. That is, when the position of the object belongs to s of the above described stage, only the sth unit is regarded as "1" and the remaining units are regarded as "0". The learning system is the same as that of FIG. 8 described above.

Figure 9:
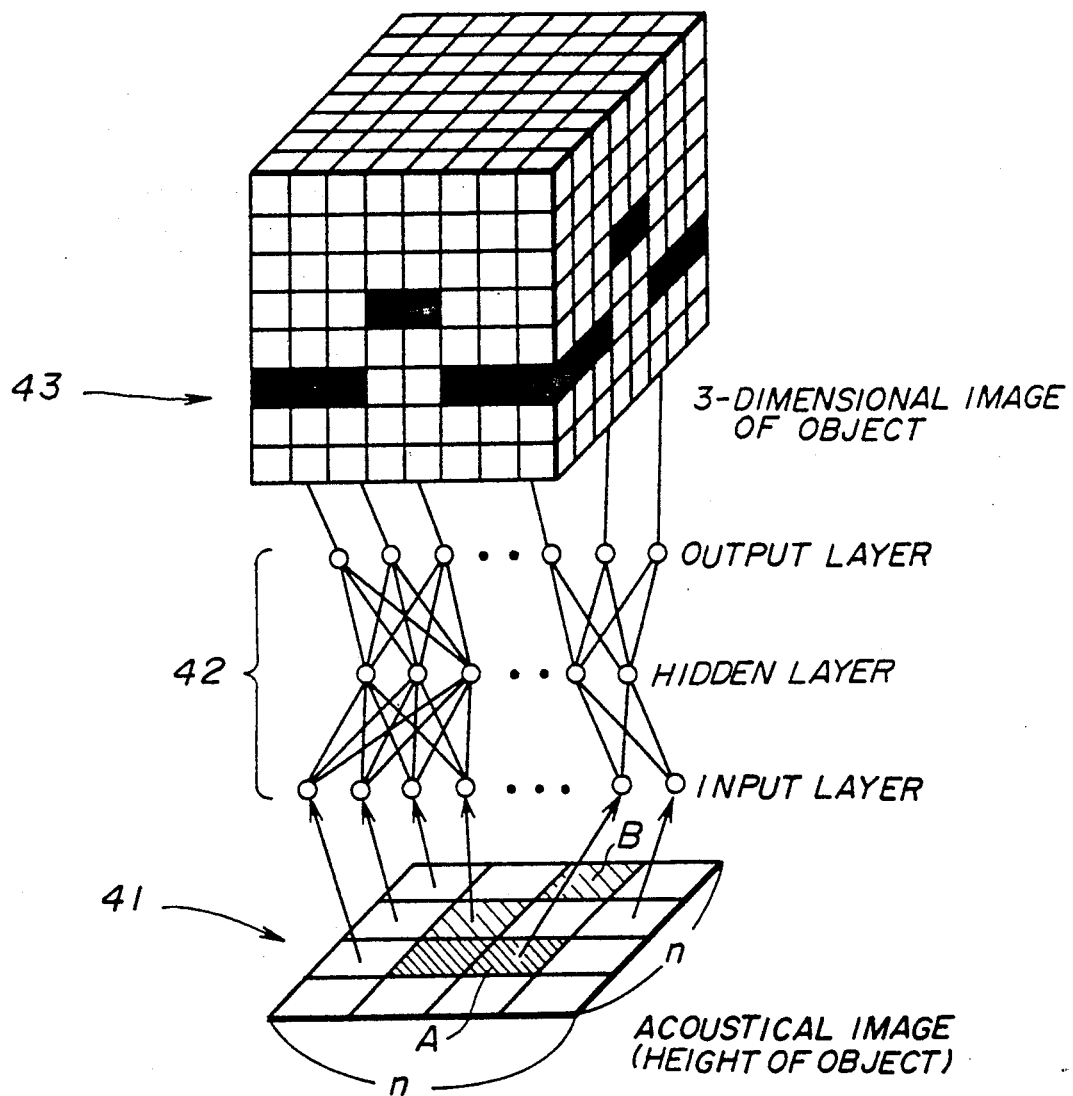
FIG. 9 is a diagram for explaining a use of the neural network in a third embodiment of the three-dimensional object imaging system according to the present invention.

FIG. 9 is a diagram for explaining a third embodiment of the three-dimensional object imaging system according to the present invention which uses a neural network. FIG. 9 shows a general shape (nxn) 41 of the object which is obtained in the above described manner, a three-layer feed forward type neural network 42 and an output result 43 of the neural network 42. This neural network 42 is simulated on the computer 7 shown in FIG. 2.

The acoustical image which is the general shape 41 of the object includes height information of the object. A dark hatching A indicates a low image and a light hatching B indicates a hight image. The number of units in the input layer of the neural network is b×b, where b≦n, and the number of units in the hidden layer may be selected appropriately. The number of units in the output layer may be selected depending on the desired size to be displayed, and is selected to c×c×d, for example. The learning data is set to the size of (c×(n−b))×(c×(n−b)), so as to use the fine shape of the object. This neural network 42 is characterized in that the learning and outputting are made while scanning the input and output. In other words, the learning and outputting are made while scanning the local relationships, and thus, it is possible to improve the accuracy of the output. In addition, the number of links (couplings) may be made small by use of the scanning, and as a result, the calculation speed becomes high and the required memory capacity becomes small.

Figure 10:
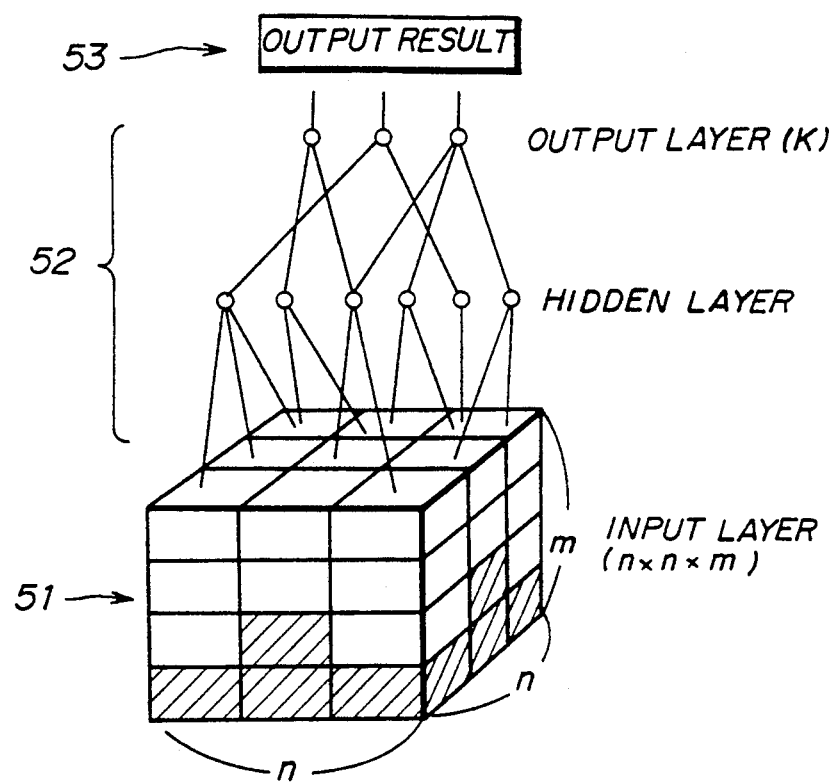
FIG. 10 is a diagram for explaining a use of the neural network in a fourth embodiment of the three-dimensional object imaging system according to the present invention.

FIG. 10 is a diagram for explaining a fourth embodiment of the three-dimensional object imaging system according to the present invention which uses a neural network. FIG. 10 shows a general shape (n+n+m) 51 of the object which is obtained in the above described manner, a three-layer feed forward type neural network 52 and an output result 53 of the neural network 52. This neural network 52 is simulated on the computer 7 shown in FIG. 2.

The neural network 52 for identifying K kinds of objects is constructed as follows. Because the general shape 51 of the object is made up of n×n×m information, input units of the neural network 52 is also nxnxm. The number of units of the hidden layer may be determined appropriately. The number of units of the output layer is set to K. The general shape 51 of the object (n×n×m information) is used as the input data, and the learning data is (1, 0, 0, ... 0) when the object belongs to a first category, (0, 1, 0, 0, ..., 0) when the object belongs to a second category, and (0, 0, 0, ..., 1) when the object belongs to the last category. When the set of the input data and the corresponding output data is given, it is possible to construct the neural network 52 which obtains the desired output based on the known back propagation method.

Figure 11:
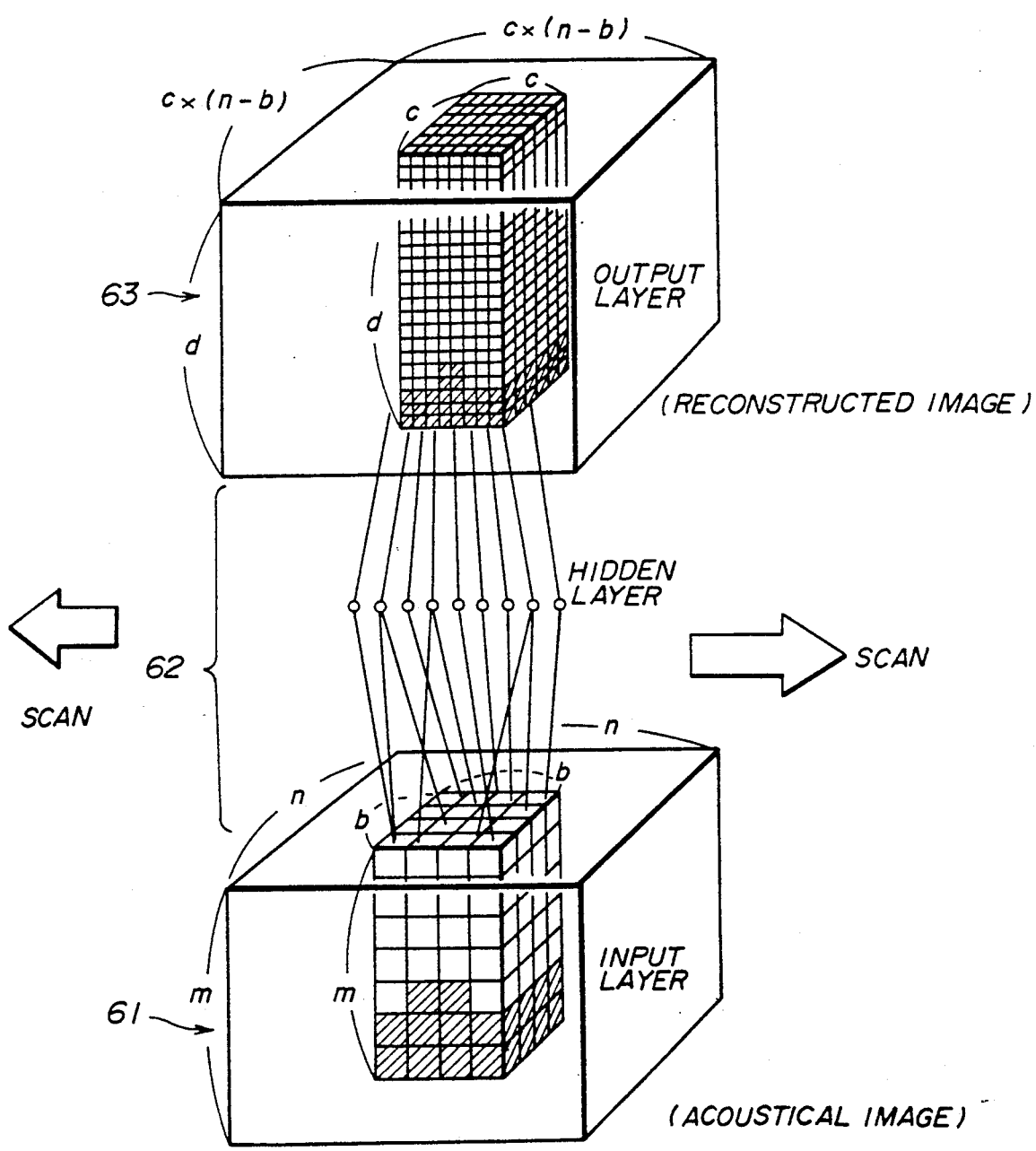
FIG. 11 is a diagram for explaining a use of the neural network in a fifth embodiment of the three-dimensional object imaging system according to the present invention.

FIG. 11 is a diagram for explaining a fifth embodiment of the three-dimensional object imaging system according to the present invention which uses a neural network. FIG. 11 shows a general shape (n×n×m) 61 of the object which is obtained in the above described manner, a three-layer feed forward type neural network 62 and an output result 63 of the neural network 62. This neural network 62 is simulated on the computer 7 shown in FIG. 2.

The number of units in the input layer of the neural network 62 is b×b×m, where b≦n, and the number of units in the hidden layer may be selected appropriately. The number of units in the output layer may be selected depending on the desired size to be displayed, and is selected to c×c×d, for example. The learning data is set to the size of (c×(n−b))×(c×(n−b)), so as to use the fine shape of the object. This neural network 62 is characterized in that the learning and outputting are made while scanning the input and output. In other words, the learning and outputting are made while scanning the local relationships, and thus, it is possible to improve the accuracy of the output. In addition, the number of links (couplings) may be made small by use of the scanning, and as a result, the calculation speed becomes high and the required memory capacity becomes small.

It was described above that the three-dimensional image of the object is obtained from the phase error of the acoustical holography images derived from sound waves of the scattering waves. However, it is also possible to successively irradiate continuous or burst waves of different frequencies on the object from one or a plurality of wave transmitters and measure the scattering waves on a plurality of wave receivers so as to form the three-dimensional acoustical holography image. In this case, the neural network can identify the object, estimate the position and rotary angle of the object, and reconstruct the image with respect to the three-dimensional image.

When measuring the three-dimensional shape of the object by irradiating the ultrasonic wave on the object and measuring the scattering waves so as to image the three-dimensional object, the above described method separates the obtained sound pressure data by the acoustical holography method for the X and Y directions and the sound pressure data is divided in time for the Z direction before carrying out the learning process in the neural network. However, according to this method, the resolution of the three-dimensional image in the X and Y directions before input to the neural network is determined by the number of wave receivers. For example, when there are $8 \times 8$ wave receivers, the number of pixels in the X and Y directions of the three-dimensional image is also $8 \times 8$. Although the neural network can convert the three-dimensional image into an image having a higher resolution, there is a limit to the capability of the neural network, and it is desirable to employ the method described hereunder.

In FIG. 7, the coordinate of the receiver is denoted by (x, y, H) and the coordinate of the object is denoted by (x', y', z'). In addition, the reflection coefficient of the object is denoted by $\xi(x', y')$, and the surface equation is described by $z' = \rho(x', y')$. The ultrasonic wave transmitter 21 located at a position r0 irradiates an ultrasonic wave described by a wave number vector $k_{in} = (k \sin \theta, 0, -k \cos \theta)$ on the object 22 at a time t=0, where $\theta$ denotes the irradiation angle. In this state, a sound pressure $P_{in}(r, t)$ of the incident ultrasonic wave is given by the following formula (8), where $\omega$ denotes the angular frequency, $\Theta(x)$ denotes a function which becomes 0 when $x < 0$ and becomes 1 when $x \geq 0$.

$$P_{in}(r, t) = \Theta(\omega t - k_{in} \cdot (r - r0))\exp(jk_{in} \cdot (r - r0) - j\omega t) \quad (8)$$

A theoretical value P(r, t) of the sound pressure measured at the time t by the wave receiver 23 which is located at the position r is given by the following formula (9).

$$P(r, t) = j\exp(jkr)F(r)/(4\pi r)\int\int dx'dy' \quad (9)$$
$$\exp(jV \cdot r') \cdot \xi(x', y')$$
$$\Theta(|r' - r0| + |r' - r|)$$

For the sake of convenience, the following designations are used in the formula (9).

$r = |r|$ $V = (Vx, Vy, Vz)$ $Vx = -k(x/r - \sin \theta)$ $Vy = -k(y/r)$ $Vz = -k(z/r + \cos \theta)$ $r' = (x', y', \rho(x', y'))$ $F(r) = |V|^2/Vz$ By use of the above described relationships and making a mathematical transformation, the following formula (10) can be derived, where c denotes the speed of sound and T denotes a time parameter.

$$\xi(x', y')\Theta(cT + (1 + \cos\theta)\rho(x', y'))$$
$$\exp(-jk(1 + \cos\theta)\rho(x', y')) =$$
$$(kz)^2/\pi\exp(-jkx'\sin\theta)\int\int dxdy$$
$$P(r, T + (r + r0)/c)\exp(jk(xx' + yy')/r) \quad (10)$$

By use of the formula (10), it is possible to calculate the shape of the object from the sound pressure which is measured by the receiver array.

The integration in the formula (10) is calculated as a sum of the sound pressures measured by the wave receivers. For this reason, the maximum resolution which is conventionally obtainable is determined by the number of wave receivers. But in this method of the present invention, it is possible to form an image having a higher resolution by carrying out the above described integration after inserting in addition to the sound pressures measured by the wave receivers the sound pressures of the scattering waves in a space which cannot be measured because no wave receiver is actually provided in this space.

FIG. 12 is a diagram for explaining the insertion of the sound pressures which cannot measured. It is assumed for the sake of convenience that the wave receivers are arranged in a matrix arrangement. In FIG. 12, P denotes a sound pressure which can be measured due to the provision of the wave receiver, and 0 denotes a dummy sound pressure which is inserted because no wave receiver is actually provided and the sound pressure cannot be measured. It is assumed that the 0's are arranged at the same intervals as the intervals of the P's and on the outer side of the P's corresponding to positions where the wave receivers are actually provided. FIG. 12 shows a case where the number of wave receivers is $8 \times 8$ and the number of imaginary wave receivers is $16 \times 16$.

According to the conventional method, the image reconstruction is carried out by use of the acoustical holography method for the $8 \times 8$ sound pressures, but according to this method of the present invention, the image reconstruction is carried out by use of the acoustical holography method for the $16 \times 16$ sound pressures including the dummy sound pressures. In this case, since the dummy (imaginary) sound pressure which is inserted is 0, the high frequencies of the $16 \times 16$ acoustical holography image are cut and smoothened by the image processing. However, because the sound pressure measured by the acoustical holography method is a complex number, the image which is obtained by this method of the present invention is not merely smoothened but includes more information.

In the image which is obtained by inserting the dummy sound pressures in accordance with the theory of the acoustical holography method, the image which is directly obtained has the same range as the image which can be imaged and the number of pixels is large. In other words, the length amounting to one pixel becomes short and the resolution is improved but the range in which the image can be imaged is the same.

The three-dimensional image of the object which is obtained by the above described method (absolute value of the left term of the formula) becomes a value A(x', y', z') which indicates the probability of the existence of the object at the coordinate (x', y', z'). Theoretically, A(x', y', z') becomes as follows.

$$A(x', y', z') = \begin{cases} \xi(x', y') \text{ when } (z < \rho(x', y')) \\ 0 \text{ (otherwise)} \end{cases}$$

In order to obtain $\rho(x', y')$ from $A(x', y', z')$, a threshold process is carried out in the Z direction. The estimated value of $\rho(x', y')$ is obtained by this method, but generally, $A(x, y, z)$ includes an error or blurr caused by noise, measuring error and the like. Hence, in order to more accurately obtain the surface shape $z' = \rho(x', y')$ from the image of the object, it is possible to employ the method of learning the given image in the neural network. When using the neural network, it is possible to obtain an image having an even higher resolution by setting a large number of output pixels.

Figure 13:
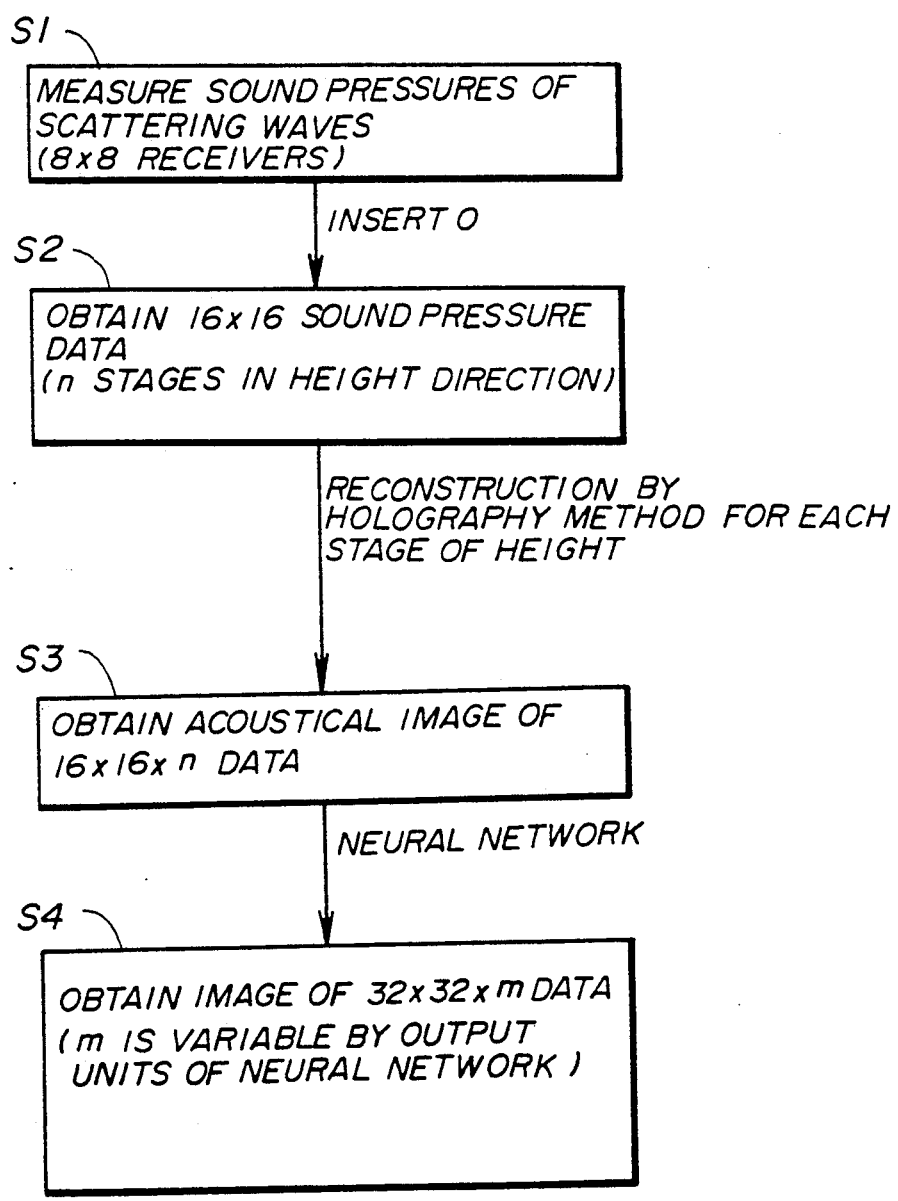
FIG. 13 is a flow chart for explaining the second through fourth embodiments of the three-dimensional object imaging system according to the present invention.

FIG. 13 is a flow chart for explaining the second through fifth embodiments of the three-dimensional object imaging system according to the present invention for obtaining a high resolution. In this case, it is assumed for the sake of convenience that the number of wave receivers is $8 \times 8$, the number of data of the three-dimensional acoustical image is $16 \times 16$, and the number of data of the reconstructed object image is $32 \times 32$.

First, the ultrasonic wave is irradiated on the object from the wave transmitter. In FIG. 13, a step S1 measures the sound pressures of the scattering waves received from the object by the $8 \times 8$ wave receivers which are arranged in the matrix arrangement A step S2 obtains $16 \times 16$ sound data by assuming that P denotes the sound pressure which is actually measured by the wave receiver and 0 denotes the inserted sound pressure which cannot be measured because no wave receiver is provided. In this case, there are n stages in the direction of the height.

A step S3 obtains an acoustical image of $16 \times 16 \times n$ data by carrying out an image production in conformance with the acoustical holography method for each of the n stages. A step S4 uses the neural network to obtain an object image of $32 \times 32 \times m$ data. In this case, m is variable depending on the number of the output units of the neural network.

Therefore, it is possible to obtain a three-dimensional object image having a high resolution. In the described embodiments, the ultrasonic wave is used for the sake of convenience, however, it is possible to use waves other than the ultrasonic wave such as the electromagnetic waves in general and particularly the micro-waves.

Further, the present invention is not limited to these embodiments, but various variations and modifications may be made without departing from the scope of the present invention.

What is claimed is:

1. A three-dimensional object imaging method implemented on a computer for imaging an object, said three-dimensional object imaging method comprising the steps of:
   irradiating ultrasonic waves having two mutually different frequencies on the object which is to be imaged;
   measuring sound pressures of scattering waves from the object so as to obtain two acoustical holography images thereof; and
   obtaining a three-dimensional shape of the object based on a phase error between the two acoustical holography images.

2. The three-dimensional object imaging method as claimed in claim 1, wherein said irradiating step employs ultrasonic waves selected from a group of waves including burst and continuous waves.

3. The three-dimensional object imaging method as claimed in claim 1, wherein said measuring step includes the substeps of:
   obtaining the acoustical holography images for X and Y directions from sound pressure waveforms of the scattering waves, said X and Y directions respectively corresponding to width and height of the object; and
   dividing the sound pressure waveforms of the scattering waves at various points in time at intervals which are integral multiples of one period of the sound pressure waveforms, said Z direction corresponding to a depth of the object.

4. The three-dimensional object imaging method as claimed in claim 1, wherein said obtaining step obtains the three-dimensional shape $\eta(x', y')$ of the object based on a formula $$\begin{aligned} P(r) &= i\exp(ikr)F(r)/(4\pi r) \\ &\quad \int dx' \int dy' \int dz' \exp(iV \cdot r')\eta(x', y') \\ &= i\exp(ikr)F(r)/(4\pi r) \\ &\quad \int dx' \int dy' \int dz' \exp(ik(x'\sin\theta - z'\cos\theta)) \\ &\quad \eta(x', y')\exp(-ik(xx' + yy' + zz')/r) \end{aligned}$$

where a surface equation of the object is described by $z' = \rho(x', y')$, a reflection coefficient is denoted by $\xi(x', y')$, an irradiation angle of the ultrasonic waves is denoted by $\theta$, k denotes a wave number, a transmitted wave $Pi(r)$ is described by $Pi(r) = exp(iki\ r)$, where $ki = (k\sin\theta, 0, -k\cos\theta)$, a complex sound pressure at a position $r = (x, y, z)$ where the scattering waves are measured is denoted by $P(r)$, $V = (-k(x/r - \sin\theta, -ky/r, -k(z/r + \cos\theta))$, $r' = ((x', y', \rho(x', y'))$ and $F(r) = |V|^2/(-k(z/r + \cos\theta))$.

5. The three-dimensional object imaging method as claimed in claim 1, wherein said measuring step measures the scattering waves by a plurality of wave receivers which are arranged in an array within a first space.

6. The three-dimensional object imaging method as claimed in claim 5, which further comprises the step of inserting dummy sound pressures to the sound pressures measured by said array of wave receivers, said dummy sound pressures being inserted within a second space which is located on an outside of said first space and where no wave receiver is provided.

7. The three-dimensional object imaging method as claimed in claim 1, which further comprises the step of processing the three-dimensional shape of the object obtained in said obtaining step, said processing being selected from a group of processes including identification of the object, estimation of a position of the object, estimation of a rotary angle of the object, reconstruction of an image of the object, and reconstruction of a surface shape of the object.

8. The three-dimensional object imaging method as claimed in claim 7, wherein said processing step uses a neural network which is simulated on the computer.

9. A three-dimensional object imaging system for imaging an object, said three-dimensional object imaging system comprising:
   irradiating means for irradiating ultrasonic waves having two mutually different frequencies on the object which is to be imaged;

detecting means for detecting sound pressures of scattering waves from the object; and processing means coupled to said detecting means and including first means for obtaining two acoustical holography images thereof, and second means for obtaining a three-dimensional shape of the object based on a phase error between the two acoustical holography images.

10. The three-dimensional object imaging system as claimed in claim 9, wherein said irradiating means employs ultrasonic waves selected from a group of wave including burst and continuous waves.

11. The three-dimensional object imaging system as claimed in claim 9, wherein said first means of said processing means obtains the acoustical holography images for X and Y directions from sound pressure waveforms of the scattering waves and divides the sound pressure waveforms of the scattering waves at various points in time at intervals which are integral multiples of one period of the sound pressure waveforms, where said X and Y directions respectively correspond to width and height of the object and said Z direction corresponds to a depth of the object.

12. The three-dimensional object imaging system as claimed in claim 9, wherein said second means of said processing means obtains the three-dimensional shape $\eta(x', y')$ of the object based on a formula $$\begin{aligned} P(r) &= i\exp(ikr)F(r)/(4\pi r) \\ &\quad \int dx' \int dy' \int dz' \exp(iV \cdot r')\eta(x', y') \\ &= i\exp(ikr)F(r)/(4\pi r) \\ &\quad \int dx' \int dy' \int dz' \exp(ik(x'\sin\theta - z'\cos\theta)) \\ &\quad \eta(x', y')\exp(-ik(xx' + yy' + zz')/r) \end{aligned}$$

where a surface equation of the object is described by $z' = \rho(x', y')$, a reflection coefficient is denoted by $\xi(x', y')$, an irradiation angle of the ultrasonic waves is denoted by $\theta$, k denotes a wave number, a transmitted wave Pi(r) is described by $Pi(r) = exp(iki \cdot r)$, where $ki = (k \sin \theta, 0, -k \cos \theta)$, a complex sound pressure at a position $r = (x, y, z)$ where the scattering waves are measured is denoted by $P(r)$, $V = (-k(x/r - \sin \theta, -ky/r, -k(z/r + \cos \theta))$, $r' = ((x', y', \rho(x', y'))$ and $F(r) = |V|^2/(-k(z/r + \cos \theta))$.

13. The three-dimensional object imaging system as claimed in claim 9, wherein said detecting means includes a plurality of wave receivers which are arranged in an array, and said first means of said processing means measures the scattering waves by said array of wave receivers within a first space.

14. The three-dimensional object imaging system as claimed in claim 13, wherein said processing means further includes third means for inserting dummy sound pressures to the sound pressures measured by said first means, said dummy sound pressures being inserted within a second space which is located on an outside of said first space and where no wave receiver is provided.

15. The three-dimensional object imaging system as claimed in claim 9, wherein said processing means further includes third means for processing the three-dimensional shape of the object obtained in said second means, said processing being selected from a group of processes including identification of the object, estimation of a position of the object, estimation of a rotary angle of the object, reconstruction of an image of the object, and reconstruction of a surface shape of the object.

16. The three-dimensional object imaging system as claimed in claim 15, wherein said third means of said processing means uses a neural network which is simulated by said processing means.

* * * * *